Figure 1:
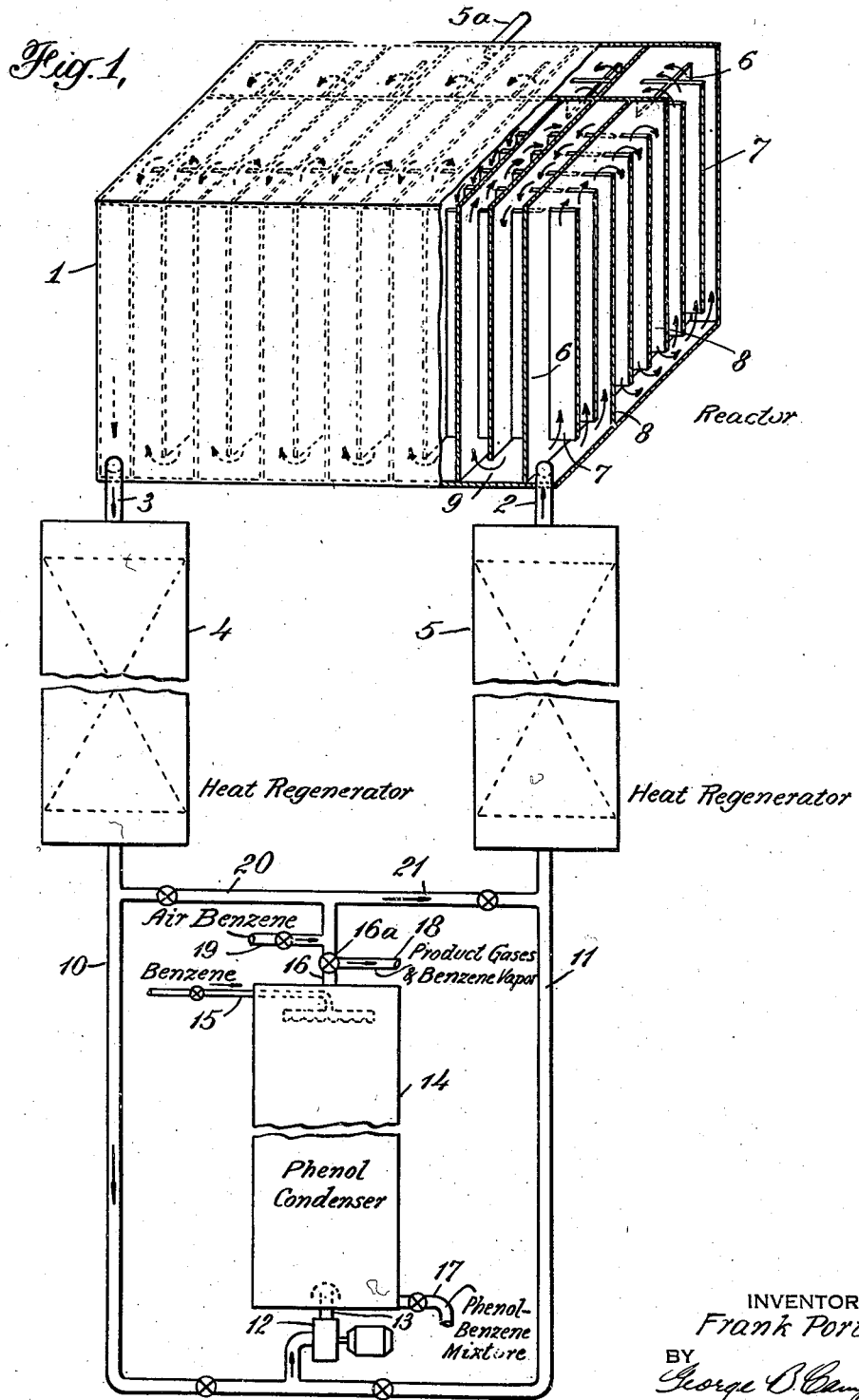

Jan. 15, 1946.   F. PORTER   2,392,875
MANUFACTURE OF PHENOL
Filed Feb. 21, 1941   3 Sheets-Sheet 1

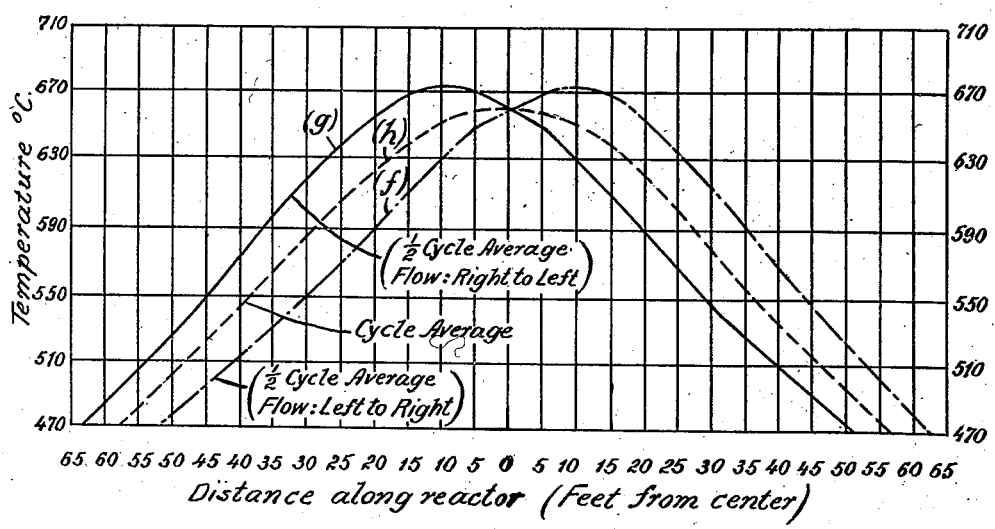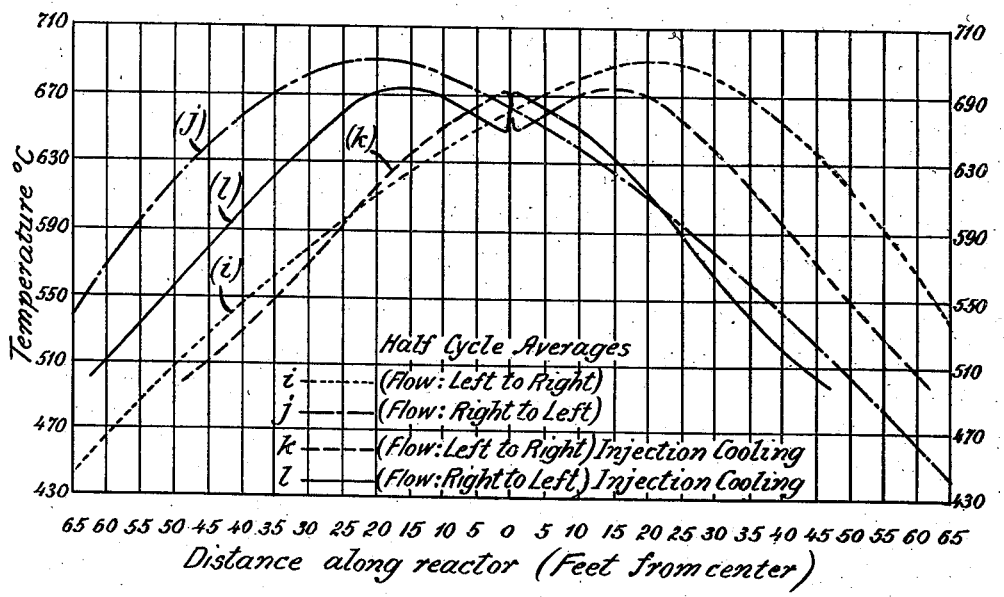

Patented Jan. 15, 1946

2,392,875

UNITED STATES PATENT OFFICE 2,392,875

MANUFACTURE OF PHENOL

Frank Porter, Syracuse, N. Y., assignor to The Solvay Process Company, New York, N. Y., a corporation of New York Application February 21, 1941, Serial No. 379,923

6 Claims. (Cl. 260—621)

This invention relates to the manufacture of phenol by the vapor phase oxidation of benzene.

In United States Patent 2,223,383 of Wendell W. Moyer and William C. Klingelhoefer there is described a process for the manufacture of phenol from benzene. The process comprises mixing the benzene in vapor phase with air or other gas containing molecular oxygen and passing the mixture through a space reactor at an elevated temperature to oxidize a minor proportion of the benzene to phenol.

The adaptation of this process to manufacture of phenol on a large scale presents difficulties.

First, the desired reaction proceeds at practicable rates only at high temperatures or at high pressures. High pressure operations entail the possibility of leakage and consequent danger of injury as a result of exposure of workmen to poisonous fumes. For a maximum of safety in conducting the process it is accordingly desirable to employ reaction pressures near or below atmospheric pressure. At pressures in the vicinity of atmospheric pressure, reaction temperatures most suitable from the standpoint of phenol yield and plant capacity lie between 600° and 800° C. It will be appreciated that at these high temperatures most materials commonly employed for constructing reaction equipment are unsuitable.

Second, even if the reaction is controlled so that less than 10% of the benzene used is oxidized, the reaction generates sufficient heat to raise the temperature of the reaction mixture upwards of 300° C. This in itself would not be a serious problem but for the fact that not only phenol formation but a number of side reactions take place at greatly accelerated rates as the temperature is increased. The degree of oxidation may be limited by controlling the proportion of oxidizing gas but the side reactions continue even in the absence of oxygen. The relationship of reaction rate and temperature for the main oxidation and for the side reactions demands accurate coordination of reaction time and temperature for satisfactory phenol yields.

Temperature control is thus essential. Yet the conditions involved cause rapid deterioration of metallic heat exchange equipment such as customarily used to control hydrocarbon oxidations.

Finally, the oxidation process seems to be allergic in various degrees to all of the customary construction materials and those materials least injurious to phenol yields are not such as are normally regarded as suitable for connstruction of reaction equipment where accurate temperature control must be combined with effective removal of heat of reaction.

The present invention has for an object the conduct of the vapor phase oxidation of benzene to phenol on a commercial scale in such a manner and in an apparatus of such design that the problems of reaction temperature control and heat removal are effectively solved using ordinary structural materials readily available.

In accordance with the present invention the vapor phase oxidation of benzene to phenol is conducted by passing a reaction mixture comprising benzene vapor and oxygen through a reaction zone defined by heat cumulative material and periodically reversing the flow of reaction mixture through the reaction zone. It has been found that the reaction may be effectively controlled in such an apparatus to produce, on a large scale, yields of phenol substantially equal to those obtained in laboratory tests in carefully regulated small scale laboratory equipment.

In order that the invention may be employed effectively it is advisable to follow several general rules in the design of the reaction equipment. It has been found, for example, that the reaction zone should be in the form of an elongated chamber or chambers such that the ratio of mass velocity, MV, expressed as pounds of reaction mixture per hour per square foot of cross-sectional area of reaction zone, to space velocity, $SV_{200}$, expressed as cubic feet of gas at standard temperature and pressure (0° C., 760 mm.) per cubic foot of reaction space per hour, is at least 2. It is especially important that the $MV/SV_{80}$ ratio be numerically at least 1.4. The subscripts designate the portion of the reaction apparatus concerned. $SV_{80}$ is the space velocity calculated on that part of the reactor within 80 centigrade degrees of the maximum average reactor temperature and $SV_{200}$ is the space velocity calculated on that part of the reactor within 200 centigrade degrees of the maximum average reactor temperature.

In general for large scale operations it is preferred that the reactor have a passage length of at least 40 feet. For example, the reactor may have a single passage 1 to 2 inches wide and 100 to 200 feet long, or several such passages in parallel. It is not necessary that the passage be straight and indeed it is preferred that it should not be. Thus, in the preferred structure the passage is folded back upon itself into a compact reactor.

When a plurality of passages are employed in parallel, they should be connected frequently with one another to provide opportunity for the reaction mixture in each passage to mix with reaction mixture from the other passages. At least a half dozen of such mixing zones spaced relatively uniformly along the reaction chamber are desirable in order to assure uniformity of reaction conditions in all of the individual passages. Similarly, if a single passage having one cross-sectional dimension much longer than the other is employed, frequent opportunity to mix the gases from the several lateral sections of the passage should be provided. A single passage 1½" x 4½" in cross-section needs no such mixing but if the 4½" dimension is increased to, say, several feet, such mixing should be effected.

The apparatus should be constructed with due regard for the output desired. For most satisfactory operations the value of $SV_{200}$ should lie between 200 and 400 and the value of MV should lie between 2000 and 8000.

In the oxidation of benzene to phenol it is desirable to present a minimum of surface commensurate with adequate temperature control. Since heat transfer between the reaction mixture and the surface of heat cumulative material is relatively slow where the temperature difference between the gas and surface is small, it is not desirable to provide sufficient surface to bring the mixture into substantial temperature equilibrium with the surface with which it is, at the instant, in contact, but it is desirable that a rather wide average temperature difference between gas and adjacent surfaces exist. This average in the portion of the reactor where substantial reaction occurs is preferably in the neighborhood of 20 to 35 centigrade degrees, the average being calculated by determining the difference between the average temperature of the gas in succeeding half cycles and taking half of this difference as the average temperature difference between gas and heat cumulative material. Since the coefficient of heat transfer increases with an increase in the average linear gas velocity, the most satisfactory area of exposed surface depends upon the space velocity and length of the reaction zone. Thus, for the space velocities mentioned, it is desirable that the surface area, A, expressed in square feet per cubic foot of free space should lie between $$\tfrac{1}{4} \text{ antilog} \left(\tfrac{2}{\log L}\right)$$

and $$2 \text{ antilog} \left(\tfrac{2}{\log L}\right)$$

for example $$0.9 \text{ antilog} \left(\tfrac{2}{\log L}\right)$$

where L represents the length of the reactor passage or passages, i. e. the linear distance the gases travel through the reactor, expressed in feet. This relationship is preferably maintained for that portion of the apparatus within 170° to 200° C. of the maximum average temperature (for a complete cycle). It is particularly desirable that the portion of the reactor within about 80° C. of the maximum average temperature should have the proper surface to volume ratio. Since the distance of flow through this part of the reactor may be only about half that of the above formulae, the formulae should be modified to reflect this change. Thus, for the conditions of Figs. 3 and 4 the value for A, where $L_{80}=L/2$, may be about $$0.9 \text{ antilog} \left(\tfrac{2}{\log 2 L_{80}}\right)$$

In order to provide flexibility of operation, it is preferable that the design features specified for the normal reaction zone be extended to parts of the apparatus substantially beyond this zone. To illustrate this point it may be observed that normally around 75% or more of the oxidation occurs within that portion of the reactor showing an average temperature within 80° of the maximum. If the reactor were designed with a total length such as to place the end temperature only 80° from the maximum temperature, a slight variation from normal operation might cause a substantial part of the reaction to take place outside of the reactor. Hence it is preferable to consider that the apparatus exhibiting an average temperature within about 200° C. of the maximum is the reactor and should embody the same structural details as the central section.

In the operation of the type of apparatus considered above for the production of phenol from benzene, the reaction mixture passes through the reactor at a gradually rising temperature as it approaches the center of the reactor and at a gradually falling temperature as it leaves the reactor. Gas temperatures along the gas passage at any single instant thus describe a temperature gradient having a maximum, or crown, near the center of the reactor. The average gas temperature at any point may be determined by obtaining the instantaneous gas temperatures at that point at suitable uniform intervals of time and dividing the sum of the temperature readings by the number of readings. In normal operations the average gas temperature gradient for a half cycle has its crown to leeward of the thermal center of the reactor. Thus the instantaneous gas temperatures for a full cycle of operation may be represented by a mobile temperature gradient having its crown moving first toward one end of the reactor, then toward the other. The thermal center of the reactor may be determined by plotting the average gas temperatures for a full cycle vertically versus length of the reactor horizontally and observing the point to the right and left of which the gradient embraces equal areas. This point may be regarded as the thermal center. Normally it coincides with the point of maximum average gas temperature and the point of maximum average temperature of heat cumulative material. It normally will be about equally spaced from the ends of the reaction passage but need not be at this point.

In order that the process may be kept within proper bounds, the direction of gas flow should be reversed at intervals each no longer than sufficient to generate as heat of reaction 20 times the heat capacity of that part of the heat cumulative material whose average temperature is within 80° C. of the maximum average temperature.

While the process of the present invention is applicable to the vapor phase oxidation of benzene to phenol in general, it is particularly adapted for operations at high temperatures, e. g. operations involving average thermal center temperatures between 600° and 800° C. These temperatures are the temperatures at which the oxidation proceeds rapidly and smoothly at pressures near atmospheric pressure, e. g. between 0.5 and 5.0 atmospheres absolute, but at which the ordinary equipment commonly used for reactions such as the oxidation of hydrocarbons, is unsuitable.

The practical application of the present invention may be more fully understood from the following detailed discussion and appended drawings. In the drawings, Fig. 1 is a schematic diagram of suitable apparatus for carrying out the invention; and Figs. 2, 3, and 4 are reactor temperature gradients for various operations to be hereinafter described.

Figure 2:
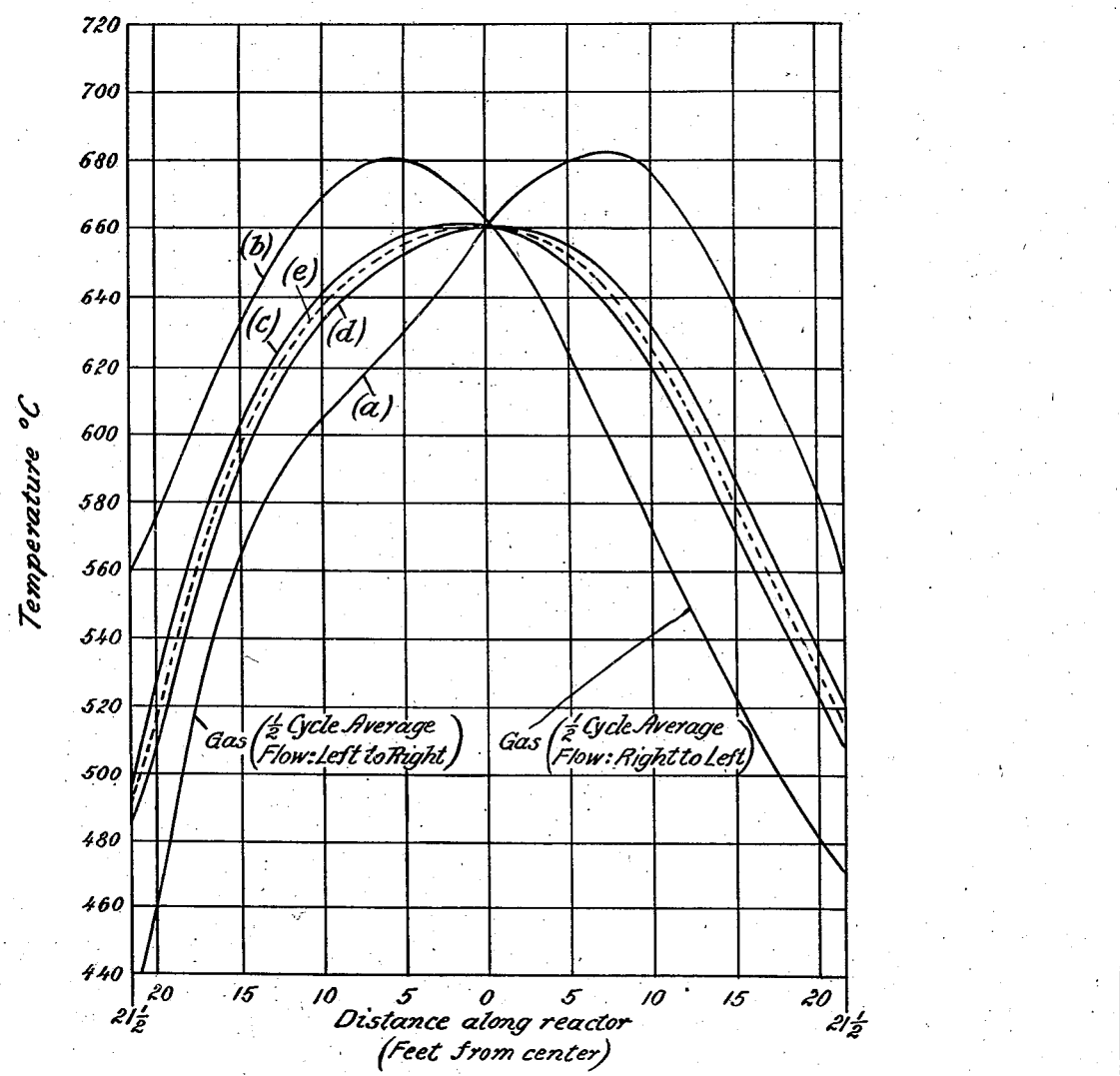

With especial reference to Fig. 1 of the drawings, the illustrated assembly for conducting the process involves a reactor 1 connected at opposite ends with conduits 2 and 3 leading to regenerators 4 and 5 and connected at its center with conduit 5a.

As will be apparent from a consideration of the dimensions given later, reactor 1 has been shown somewhat out of scale to better illustrate its fundamental structure. The reactor comprises a labyrinthine chamber divided by partitions into tiers, each of which is further divided into a series of groups of parallel passages so arranged that gases from the parallel passages of each group intermingle before passing into the passages of the next succeeding group. In the drawings the exterior walls of the reactor have been removed from the first few tiers to show the internal construction more clearly. Thus, it may be seen that the first tier into which conduit 2 leads comprises a partition 6, which is common to the first and second tiers, and a plurality of short cross-partitions 7 and long cross-partitions 8. Each pair of partitions 7 is separated from the next pair by one of the long partitions 8 and each of the long partitions 8 is staggered with respect to the next. This arrangement provides for flow of three parallel streams of gas up in front of the near partition 8 to the top, where the three streams are mixed and redivided, down between it and the far partition 8 to the bottom, where the streams are mixed again and divided anew, and up again behind the far partition 8. On the far side of the far partition 8 partition 6 is cut away at the top to permit passage of gas into the second tier of the reactor. The gas passes as a group of parallel streams through a series of groups of parallel passages in the second tier, alternately down, up, down, and finally out at 9 to the next tier, and so on through the apparatus, with mixing of the gas streams at each change of direction.

Innumerable variations in reactor design are conceivable but fundamentally the reactor comprises a series of individual passages or a series of groups of parallel passages, each passage being defined by heat cumulative material and being relatively long compared with one cross-sectional dimension and relatively short compared with the total length of the series; and a plurality of mixing zones for intermingling the gases from various parts of the individual passage or from various passages of a group, between each passage or group and the next in series.

The reactor may be constructed of fire-brick, of which there are a number of types available. A typical analysis of a suitable fire-brick is about 61.7% silica, about 32.7% alumina and titania, and 2.8% ferric oxide. Such bricks are marketed as bricks and so-called split-bricks in standard sizes 4½" x 9" x 2½", and 4½" x 9" x 1¼", respectively. The reactor walls may be formed by laying these bricks, preferably those of 2½ inch thickness, so that the wall thickness is the same as the brick thickness. Preferably, courses are laid so as to provide passages one cross-sectional dimension of which is between 1 inch and 2 inches; the other dimension may be 4½ inches, 9 inches, or more, but ordinarily will be substantially more than 2 inches. It is desirable that the walls of the reactor be well coated with boron oxide as more fully described in United States patent application Serial No. 346,999, filed July 23, 1940, by Wendell W. Moyer. The various courses of bricks within the reactor need not be cemented in place since small crevices do not adversely affect the reaction. A slight degree of leakage between tiers is in fact beneficial since it tends to spread out the zone of maximum temperature. The entire reactor may be surrounded with several courses of fire-brick or insulating brick or both, and a metal shell may be provided to avoid gas leakage from or to the system.

The internal construction of regenerators 4 and 5 may be similar to the construction of reactor 1. However it is preferable to employ as regenerators fire-brick-lined chambers randomly packed with broken fire-brick, for example 1" to 2" lump fragments, providing a zone of tortuous flow through a mass of heat cumulative material in each regenerator. Such regenerators are relatively inexpensive to construct, and occupy considerably less space than regenerators of the same heat transfer and storage capacity constructed like reactor 1. Since the temperature-time relationship in regenerators 4 and 5 does not cause material loss of benzene or phenol in these units even with the relatively extensive surface contact area provided by 1" to 2" lump packing, the advantages of maximum heat transfer per unit of volume may be realized without sacrifice of yield.

Regenerators 4 and 5 are connected by valve-controlled conduits 10 and 11 with a blower 12 which in turn is connected by a conduit 13 to the bottom of a wash tower 14 provided at the top with a valve-controlled inlet pipe 15 for washing liquid, such as benzene, and an outlet conduit 16 for gas, and at the bottom with an outlet pipe 17 for liquid. Outlet conduit 16 is provided with a branch 18 for leading off gas from the system and with a valve-controlled branch 19 for leading air or benzene vapor air mixture into the system. Conduit 16 is connected with regenerators 4 and 5 by valve-controlled conduits 20 and 21, respectively. Gas flow from tower 14 is controlled by a two-way valve 16a, which may be adjusted to direct all or a definite proportion of the gas through branch 18.

The operation of the above apparatus is as follows:

For the initial heating up, hot combustion gas is introduced through conduit 5a into reactor 1 and drawn out through regenerator 5 and conduit 11 by blower 12 and exhausted to the atmosphere. (Instead of passing combustion gases through tower 14, they may be expelled directly to the atmosphere.) This heating up is continued until the right-hand portion of reactor 1 has been heated to the desired reaction temperature. By proper control of the valves on lines 10 and 11, flow then is directed from the reactor through the regenerator 4 and conduit 10 to warm up this section of the apparatus. Since in the first half-cycle of actual operation regenerator 5 serves as a heater for reaction mixture and regenerator 4 as a cooler for reaction products, regenerator 4 requires much less heating than regenerator 5.

After the reactor and regenerators have been heated to operating temperatures, the valves on conduits 19 and 21 are opened to permit flow of air and benzene vapor successively through regenerator 5, reactor 1, regenerator 4, conduit 10, blower 12, and tower 14. The rate of flow should be sufficient to leave 5% to 10% of free oxygen in the exhaust gas. At the same time sufficient flow of benzene is provided in tower 14 to wash phenol from the reaction mixture. Fresh benzene vapor air mixture is introduced continuously through conduit 19 and washed product gases, now saturated with benzene and preferably still at a temperature of 50°–60° C., are led off through conduit 18 for further treatment. The proportion of the total reaction mixture led off at 18 may vary from only a minor proportion up to all. In general it is desirable to bleed at a sufficient rate to maintain the free oxygen content of exhaust gas above 5%. The flow of reaction mixture through the reactor from right to left may continue for one minute, two minutes, four minutes, or such other period as is desired for each half-cycle. At the end of this period the valves on conduits 10 and 21 are closed and those on 11 and 20 are opened to cause a reversal of direction of flow so that benzene vapor air mixture flows successively through regenerator 4, reactor 1, and regenerator 5 to tower 14. By employing a blower on the outlet side of the reactor the reactor may be maintained at sub-atmospheric pressure, for instance an absolute pressure between 14.0 and 14.6 pounds per square inch, and thus if any leakage occurs in the reactor 1 or regenerators 4 or 5, the leakage causes passage of air into the system rather than passage of benzene or phenol vapor out therefrom to the atmosphere.

Benzene and phenol are withdrawn through outlet pipe 17 continuously and may be processed in a continuous column to separate benzene, phenol, and other products.

Fig. 2 shows representative temperature gradients for normal operating conditions in a reactor generally similar to that illustrated in Fig. 1 of the drawings.

The reactor comprised six parallel passages each about 43 feet long with a cross-section of 1.39" x 4½" with seventeen mixing spaces disposed at approximately equal distances along the passages. The passages were defined by 1¼" x 4½" x 9" boron-oxide-coated fire-clay brick providing a wall thickness of 1¼ inch.

An air benzene vapor mixture comprising air and benzene in a mol or volume ratio of about 1.05 was passed through the reactor at an hourly mass velocity of about 1612 and at an hourly space velocity of about 278 (STP) based on total free space in the reactor, and direction of flow was reversed every 60 seconds to provide a 2-minute operating cycle.

In the illustrative run, which was of about 14 hours duration, about 92.4% of the benzene input passed through the reactor unreacted. The distribution of reacted benzene among phenol, liquid by-products (chiefly diphenyl), and gaseous by-products was about as follows:

| | Percent |
|---|---|
| Benzene to phenol | 43 |
| Benzene to liquid by-products | 25 |
| Benzene to gaseous by-products | 32 |

Analysis of a composite of spot exit gas samples showed an average exit gas composition, by volume, as follows:

| | Percent |
|---|---|
| $O_2$ | 9.7 |
| $N_2$ | 74.3 |
| CO | 10.2 |
| $CH_4$ | 1.8 |
| $H_2$ | 1.8 |
| $CO_2$ | 0.9 |

With especial reference to the values plotted in Fig. 2, temperatures were determined at a number of points along the reactor passages and these temperatures (expressed in degrees centigrade) were plotted against their distance from the center of the reactor (expressed in feet).

The gradients $a$ and $b$ are the average gas temperature gradients for representative half-cycles, $a$ showing the average gradient with gas flow from left to right (on the diagram) and $b$ showing the average gradient with a reverse direction of gas flow.

A word of caution is necessary with respect to the interpretation of observed values. Normally temperatures measured by thermocouples within the reactor do not indicate accurately the prevalent instantaneous gas temperature at the instant of reading since the thermocouples are affected not only by the gas temperature but also by the temperature of the walls from which or to which the thermocouple acquires or loses heat and by the heat capacity of the thermocouple well which acts to an appreciable extent like the heat cumulative material of the walls. Both of these factors create a lag in the thermocouple registration which results in an indication much closer to the average wall temperature than is the true gas tempermature. Gradients $a$ and $b$ are the gradients obtained by correcting observed values to reflect radiation and heat capacity factors.

Gradients $d$ and $e$, which are the average observed temperatures for the same periods as gradients $a$ and $b$, respectively, have been included to illustrate the magnitude and direction of the correction required. This correction may be somewhat more or less depending upon the composition and construction of the thermocouple wells and the heat capacity of reactor walls in the immediate vicinity of the thermocouples.

Gradient $c$ is the average gas temperature gradient for a complete cycle and closely approximates the average wall temperature since heat loss through the walls is negligible.

The locations of gradients $a$, $b$ and $c$ illustrate that, first, the average gas temperature during each half-cycle rises to a maximum which is substantially higher than the average reactor (wall) temperature maximum; second, the point of maximum instantaneous gas temperature oscillates with the direction of gas flow through the reactor and is normally leeward of the point of the average reactor temperature maximum and hence the half-cycle average gas temperature maximum is forward in the direction of gas flow or leeward of the average reactor temperature maximum; third, the thermal center in the reactor employed in the test closely approximated the physical center of the gas passages, i. e. was approximately equidistant from the two ends.

It is of interest that about one-fourth of the total heat evolved in the reactor is evolved in two hot zones within about two feet of the two crowns of curves $a$ and $b$ (in the section of the reactor between 6½ and 10½ feet to the right of the center for the periods represented by curve a). Hence, especial care should be given to the provision, in these zones, of adequate heat storage capacity for the desired operating cycle. The reactor should be constructed to provide a heat capacity in each of these "25% of reaction" section, or hot zones, of at least 0.01H where H represents the total heat of reaction evolved in the reactor per half-cycle. It is advantageous to provide a reasonably uniform heat capacity in that part of the reactor within about 80° C. of the average reactor temperature maximum and hence the heat capacity of this entire zone, which ordinarily may be around 3 to 5 times as long as the two hot zones together, may be around 0.06H to 0.1H, referred to centigrade temperature scale.

Fig. 3 shows representative temperature gradients in a reactor of the same size as that used in collecting the data for Fig. 2 but having the baffles rearranged to provide two passages each about 130 feet long. Gradients $f$ and $g$ are half-cycle average gas temperature gradients for flow toward the right and left (of the drawing) respectively, and gradient $h$ is the average wall temperature gradient or whole cycle average gas temperature gradient.

Since the cross-sectional area in the 2-passage apparatus, to which the gradients of Fig. 3 apply, is only one-third the cross-sectional area in the 6-passage apparatus, to which the gradients of Fig. 2 apply, the hourly mass velocity for Fig. 3 is 4836 compared with 1612 for Fig. 2 and the resulting proportion of benzene reacted is about 5.1% compared with 7.6%. From Figs. 2 and 3 it can be seen that at the point of maximum half-cycle average gas temperature the temperature difference between gas and adjacent walls averages from 30° to 35° C. for the 6-passage unit and between 20° and 25° C. for the 2-passage unit. The smaller temperature difference in the latter case is due to the higher coefficient of heat transfer resulting from the higher mass velocity and consequently smaller proportion of benzene reacted in the latter case.

Fig. 4 shows gradients resulting from variations in design and control to compensate for a longer gas passage and correspondingly reduced cross-section.

Gradients $i$ and $j$ are the half-cycle average gas temperature gradients in an apparatus of the same length and cross-section as in Fig. 3 but with the cross-section re-proportioned to reduce the ratio of exposed surface area in square feet from about 15 square feet to about 8⅓ square feet per cubic foot of free space.

Gradients $k$ and $l$ illustrate a method of securing in apparatus of the type involved in the operations represented in Fig. 3 results similar to those represented by gradients $i$ and $j$. The gradients $k$ and $l$ are obtained by operating the apparatus of Fig. 3 at the same gas velocities employed for producing gradients $i$ and $j$ except that the gas stream is split and about 5.7% of the total, at about 60° C., is introduced directly into the center of the reactor. Comparing gradients $i$ and $k$ it will be seen that gradient $k$ rises more rapidly and thus at the center point of the reactor, before addition of cold gas, is substantially above gradient $i$. The addition of the cold mixture chills the reaction gases and thus causes the gradient $k$ to drop below gradient $i$. It then rises again but to a maximum substantially lower than it would have reached had the total quantity of air-benzene vapor mixture been introduced at once.

The injection cooling method employed for gradients $k$ and $l$ has been found to be a highly satisfactory regulating method for correcting temporary maladjustments in ordinary operations. Thus, if the oxygen content of the exit gases begins to decrease substantially, injection of a small proportion of relatively cold fluid, such as liquid benzene, benzene vapor, steam, tail gas, reaction mixture, or other fluid of low free oxygen content, at $5a$ in Fig. 1 serves to correct excessive temperatures and to restore proper conditions, which are reflected in a quite constant free-oxygen content of the exit gases, lying preferably between 5% and 10% by volume.

Other methods of temperature control which have been found effective for handling abnormally high temperatures in the converter comprise recirculation of tail gases in varying proportions. Thus, in the event the temperature rises in reactor 1, as indicated for example by a decrease in oxygen concentration of tail gases from a normal of 9.7% to 9.0% by volume, valve 16a may be adjusted to recirculate product gases and benzene vapor along with air and benzene introduced at 19. This control method reduces the oxygen concentration of the inlet gas and thus diminishes the intensity of the exothermic oxidation reaction. A similar effect may be obtained by increasing the benzene:air ratio by suitable control of the benzene vaporization.

Conversely, if the temperature of reactor 1 becomes too low, as indicated for example by an increase in the exit gas oxygen concentration to say 10.2%, the air concentration of the entering mixture may be increased by reducing the proportion of tail gas recirculated or by reducing the proportion of benzene vaporized into the ingoing air.

Thus the control of temperature may be rendered automatic by provision of an oxygen analyzer on the exit gas stream adapted to control the proportion of air in the mixture entering the reactor. An analyzer effective for this purpose may be a catalytic combustion unit and thermostat control. Since the temperature of the gases leaving the catalytic converter unit rises with an increase of oxygen concentration and falls with a decrease thereof, the thermostat provides an oxygen-concentration-responsive control means. The catalytic combustion unit should be supplied with the tail gas at a constant rate (benzene free basis) and a constant proportion of combustible should be fed to the unit. If the phenol condenser 14 is regulated to provide a uniform outlet gas temperature therefrom and thus a substantially constant benzene content, a small proportion of this mixture may be passed to the analyzer and used for the catalytic combustion without addition of extraneous combustible. Instead of a catalytic or flameless combustion unit, a simple flame may be employed and the flame temperature used to control a thermostat.

In the appended claims space velocity, SV, is expressed as cubic feet of gas at standard temperature and pressure per cubic foot of reaction space (free space) per hour; and mass velocity, MV, is expressed as pounds of reaction mixture per hour per square foot of cross-sectional area (free space) of reaction zone.

I claim:
1. In the manufacture of phenol by vapor phase oxidation of benzene, the improvement which comprises passing a mixture comprising benzene vapor and oxygen through a three unit system comprising two units A and C packed with heat cumulative material distributed to direct a tortuous flow of gas mixture therethrough and an intermediate unit B packed with heat cumulative material distributed to provide a substantially higher ratio of free space to contact surface than units A and C and to direct flow of gas serially through a plurality of individual passages with intermediate mixing, maintaining unit B as gas temperatures represented by a temperature gradient exhibiting a maximum, passing said benzene vapor oxygen mixture through the units of said system alternately in the orders A, B, C and C, B, A whereby the aforesaid maximum is shifted toward C and toward A respectively, and controlling the frequency of alternation so as to maintain said maximum within unit B.

2. In the manufacture of phenol by high temperature vapor phase oxidation of benzene, the improvement which comprises passing a mixture comprising benzene vapor and oxygen at an absolute pressure between 0.5 and 5.0 atmospheres through a three unit system comprising two units A and C each packed with heat cumulative material distributed to direct a tortuous flow of gas therethrough and an intermediate unit B packed with heat cumulative material distributed to provide a substantially higher ratio of free space to contact surface than units A and C and to direct flow of gas serially through a plurality of individual passages with intermediate mixing, the length of the series of passages being sufficient to provide an $$\frac{MV}{SV}$$

ratio through unit B having a numerical value of at least 2, maintaining unit B at temperatures represented by an average surface temperature gradient exhibiting a maximum between 600° C. and 800° C., passing said benzene vapor oxygen mixture through the units of said system alternately in the orders A, B, C and C, B, A, whereby the instantaneous maximum gas temperature is shifted toward C and toward A respectively, and controlling the frequency of alternation so as to maintain the instantaneous maximum gas temperature within unit B and so as to maintain the average surface temperature maximum in degrees centigrade in units A and C not higher than the average surface temperature maximum in unit B minus 80.

3. In the manufacture of phenol by high temperature vapor phase oxidation of benzene, the improvement which comprises passing a mixture comprising benzene vapor and oxygen at absolute pressures between 0.5 and 5.0 atmospheres through a three unit system comprising a unit B packed with heat cumulative material disposed so as to provide an exposed surface area, expressed in square feet per cubic foot of free space, between $$\tfrac{1}{2}\ \text{antilog}\left(\frac{2}{\log L}\right)$$

and $$2\ \text{antilog}\left(\frac{2}{\log L}\right)$$

where L equals the length of said zone expressed in feet, and two units A and C each packed with heat cumulative material disposed so as to provide a substantially greater ratio of exposed surface area to free space than unit B and to direct a tortuous flow of gas therethrough, maintaining unit B at temperatures represented by an average surface temperature gradient exhibiting a maximum between 600° C. and 800° C., passing said benzene vapor oxygen mixture through the units of said system alternately in the orders A, B, C and C, B, A at an hourly space velocity between 200 and 400 and an hourly mass velocity between 2000 and 8000, whereby the instantaneous maximum gas temperature is shifted toward C and toward A respectively, and controlling the frequency of alternation so as to maintain the instantaneous maximum gas temperature within unit B and so as to maintain the average surface temperature maximum in degrees centigrade in units A and C not higher than the average surface temperature maximum in unit B minus 80.

4. In the manufacture of phenol by high temperature vapor phase oxidation of benzene, the improvement which comprises passing a mixture of about equimolar quantities of benzene vapor and air at about atmospheric pressure through a three unit system comprising a unit B packed with fire-brick disposed to direct flow of gas serially through at least a half dozen individual passages with intermediate mixing, the length, L, of the series of passages being sufficient to provide an $$\frac{MV}{SV}$$

ratio through unit B having a numerical value of at least two, and the spacing of said fire-brick being such as to provide an exposed surface area, expressed in square feet per cubic foot of free space, between $$\tfrac{1}{2}\ \text{antilog}\left(\frac{2}{\log L}\right)$$

and $$2\ \text{antilog}\left(\frac{2}{\log L}\right)$$

where L is expressed in feet, and two units A and C each comprising randomly packed refractory disposed so as to provide a substantially greater ratio of exposed surface area to free space than unit B, maintaining unit B at temperatures represented by an average surface temperature gradient exhibiting a maximum between 600° C. and 800° C., passing said benzene vapor air mixture through the units of said system alternately in the orders A, B, C, and C, B, A at an hourly space velocity between 200 and 400 and an hourly mass velocity between 2000 and 8000 whereby the instantaneous maximum gas temperature is shifted toward C and toward A, respectively, and controlling the frequency of alternation so as to generate as heat of reaction in each flow period not more than 20 times the heat capacity of the firebrick within 80° C. of said average surface temperature maximum and to thus maintain the instantaneous maximum gas temperature within unit B, and the average surface temperature maximum in degrees centigrade in units A and C not higher than the average surface temperature maximum in unit B minus 80.

5. In the manufacture of phenol by vapor phase oxidation of benzene, the improvement which comprises passing a mixture comprising benzene vapor and oxygen through a hot reaction zone containing heat cumulative material wherein said mixture passes through a plurality of passages within the heat-cumulative material, the heat of reaction of the benzene and oxygen is absorbed by said heat cumulative material and the average wall surface temperature gradient of the heat cumulative material exhibits a maximum, maintaining at surface temperatures within 80° C. of said maximum a section of the heat cumulative material bounding said hot zone sufficiently long to provide a $$\frac{MV}{SV}$$

ratio through said section having a numerical value of at least 1.4, within said section of heat-cumulative material repeatedly intermingling all the gases flowing through the plurality of passages in the heat-cumulative material and dividing the intermingled gases into separate streams which are again passed in contact with the heat-cumulative material, maintaining a sufficient flow of said benzene vapor-oxygen mixture to shift the instantaneous maximum gas temperature forward in the direction of gas flow substantially beyond the locus of said average wall surface temperature maximum, then reversing the direction of gas flow and maintaining sufficient flow to shift said maximum gas temperature forward in the new direction of gas flow substantially beyond the locus of said average wall surface temperature maximum and repeating said reversal of gas flow at intervals correlated so as to maintain the zone of maximum instantaneous gas temperatures centrally disposed with respect to said heat cumulative material.

6. In the manufacture of phenol by vapor phase oxidation of benzene, the improvement which comprises passing a mixture comprising benzene vapor and oxygen through a reaction zone containing heat-cumulative material wherein said mixture passes through a plurality of passages within the heat-cumulative material, heat of reaction of the benzene and oxygen is absorbed by said material and the average temperature gradient of said material exhibits a maximum, the length (along the direction of gas flow therethrough) of that portion of the heat-cumulative material which is at temperatures within 200 centigrade degrees of said maximum being so correlated with the rate at which said mixture is passed through said portion of the heat-cumulative material that the ratio $$\frac{MV}{SV_{200}}$$

has a numerical value of at least 2, within said portion of heat-cumulative material repeatedly intermingling all the gases flowing through the plurality of passages in the heat-cumulative material and dividing the intermingled gases into separate streams which are again passed in contact with the heat-cumulative material, maintaining a sufficient flow of said benzene vapor oxygen mixture to shift the instantaneous maximum gas temperature forward in the direction of gas flow substantially beyond the locus of said average temperature maximum, then reversing the direction of gas flow and maintaining sufficient flow to shift said maximum gas temperature forward in the new direction of gas flow substantially beyond the locus of said average temperature maximum and repeating said reversal of gas flow at intervals correlated so as to maintain the zone of maximum instantaneous gas temperatures centrally disposed with respect to said heat-cumulative material.

FRANK PORTER.